United States Patent Office 3,359,071
Patented Dec. 19, 1967

3,359,071
METHOD OF PRODUCING HYPERPURE ARSENIC
Hans Merkel, Joachim Drabner, and Wolfgang Krause, Erlangen, Germany, assignors to Siemens-Schuckertwerke Aktiengesellschaft, Berlin - Siemensstadt, Germany, a corporation of Germany
No Drawing. Filed Dec. 12, 1963, Ser. No. 329,960
Claims priority, application Germany, Dec. 24, 1962, S 83,054
5 Claims. (Cl. 23—209)

Our invention relates to a method of producing arsenic in the extreme purity required for use in electronic and related semiconductor techniques. One of these uses is in semiconductor arsenic compounds of the $A^{III}B^V$ type, such as indium arsenide, gallium arsenide and aluminum arsenide.

In methods of purifying arsenic, the elimination of impurities that possess donor properties in $A^{III}B^V$ semiconductors encounters considerable difficulties. The results of analytical and radiochemical investigations concerning the effectiveness of purifying methods for arsenic, as well as other chemical and physical considerations show that donor elements, particularly sulfur, cannot be satisfactorily removed by any of the purifying methods heretofore known.

There have been many attempts to produce arsenic which is satisfactorily free of sulfur. According to one of these attempts, the sulfur compounds contained in arsenic vapor are converted, at temperatures between 900 and 1000° C., into hydrogen sulfide and eliminated together with the waste gases. According to another purifying method, the sulfur content is reduced by treating arsenic with molten lead at temperatures of about 650° C. Both of these methods, however, prove to have relatively little purifying effect and to involve, in part, excessive requirements.

The mode of operation conventionally used involves the formation of arsenic-halogen compounds, mainly arsenic trichloride. After converting the raw arsenic and impurities contained therein, into their respective chlorides, the foreign constituents can be separated to a great extent from the arsenic trichloride by taking advantage of the respectively different boiling points of the individual components. Fractional distillation of the chlorides, as has been ascertained by radiochemical investigation, has been found highly effective for eliminating metallic impurities, such as copper or zinc. The sulfur content, however, of the raw chloride is only slightly reduced by distillation. In the raw chloride, sulfur is presumably also present in form of a halogen compound. This compound is not separable by distillation.

It has been attempted to liberate the arsenic chloride from the impurities by subjecting it to hydrolysis. Although sulfur-halogen compounds, such as $S_2Cl_2$, are dissociated by water with formation of hydrochloric acid, sulfur dioxide and amorphous sulfur, the simultaneously precipitating arsenic trioxide still contains an appreciable amount of sulfur, which cannot be fully eliminated during the subsequent reduction of the oxide to arsenic by hydrogen. Furthermore, the conversion of the chloride to elemental arsenic through the intermediate stage of the oxide is intricate and excessively demanding. There is the danger that impurities are introduced into the substance, because the processing vessels must be changed repeatedly and large quantities of water are required for hydrolysis and filtration, in usually dust-containing air. Also disadvantageous is a relatively slight yield of hyperpure arsenic due to the appreciable solubility of the arsenic trioxide (arsenious oxide) in the hydrolysis water.

It is an object of our invention to provide a method of producing highly purified arsenic, which avoids the above-mentioned shortcomings and disadvantages of the known methods and prior attempts, and which results in arsenic of electronic purity in a more economical manner.

According to our invention, we provide the raw arsenic halide, preferably arsenic trichloride, with a small quantity of water which, on the one hand, is just sufficient to hydrolyze the impurities of the arsenic halide but, on the other hand, is insufficient to cause precipitation of arsenic trioxide. We then subject the partially hydrolyzed material to fractional distillation and thereby separate a highly pure arsenic halide or arsenic trichloride from the dissociation products, and thereafter reduce the halide with purified hydrogen to arsenic. This method results in an economical operation and compartively high yields of hyperpure arsenic.

The performance of the method of our invention will be described in further detail in the following example which is not intended to limit the scope of the invention.

After raw arsenic and its accompanying impurities are converted to the chloride in the known and conventional manner, the excess chlorine contained in the liquid is boiled out. To eliminate sulfur which is present in form of a halogen compound but not separable by simple distillation, the liquid is then subjected to partial hydrolysis. For this purpose, the chlorine-free arsenic trichloride is thoroughly mixed with a small quantity of water, for example one volumetric part of water for 40 volumetric parts of arsenic trichloride. The mixing is continued for 24 hours. Larger quantities of water are unfavorable because they react with the arsenic trichloride and form arsenic trioxide. The desired reaction, namely the dissociation of the sulfur-halogen compounds by the action of water, is disturbed by the latter oxidizing reaction. A good mixing of the reaction material with water which has a lower specific gravity, such good mixing being required for a complete destruction of the sulfur-halogen compounds, is achieved by heating the mixture with reflux or by subjsecting the mixture to a forceful magnetic stirrer. Sulfur monochloride, for example, reacts with water in such a manner that a portion of the sulfur escapes in form of gaseous sulfur dioxide, whereas the residual portion occurs in form of elemental sulfur. The latter dissolves in the arsenic trichloride but can now be separated therefrom by distillation. The hydrolysis described is distinct not only by its high purifying efficacy but by its considerable simplification of the production of highly pure arsenic.

The pre-treated $AsCl_3$ is subjected to fractional distillation in a filler-body column with a reflux ratio of about 20:1. The boiling point is 130.2° C. The main fraction of the distillate, constituting 75% of the starting product, is reduced to elemental arsenic.

For this purpose, the main fraction, consisting of pure arsenious chloride, is evaporated at a bath temperature of 140° C., while hydrogen is simultaneously passed through the evaporating vessel. As a result, the arsenic trichloride vapor is simultaneously mixed with reduction gas. The mixture is passed into the reaction tube heated to the reaction temperature, desirably at a temperature of at least about 500° C. In the temperature zone of 850° C. within the reaction tube, there occurs the most favorable reduction of the halogen compound by the hydrogen to form elemental arsenic. In this reaction, hydrogen chloride gas which simultaneously evolves, escapes from the reaction space together with the excess hydrogen.

At the end of the reaction tube, in the temperature zone of 350 to 400° C., the precipitation takes place in form of α-arsenic. The yield of this method is approximately 70%. The residual 30% occur in form of β-arsenic and γ-arsenic. To precipitate the arsenic to a major extent in form of its metallic modification, care should be taken that the flow speed of the hydrogen gas does not exceed a maximum value of 6 liter/hr. cm.$^2$.

A comparison of the purification degree of arsenic obtained by different purifying methods was, to date, only possible by indirect analysis, because no sufficiently sensitive methods are known for a direct determination of foreign elements by analytical means. It is therefore necessary to derive an indication with respect to the purity degree of arsenic from the electron mobility of a semiconductor made therefrom. For this purpose, arsenic charges produced by respectively different purifying methods were used for the preparation of InAs rods. The measured electron mobilities are utilized for comparing the efficacy of the purifying methods upon the reduction of impurity elements.

A comparison of this type is presented in the following tabulation. Indicated are a number of known purifying methods (Nos. 1 to 6) as well as their effectiveness with respect to the diminution in impurity elements; and the corresponding comparative data given with respect to a method No. 7 carried out in accordance with the invention. In the tabulation, $R_H$ denotes the value of the Hall coefficient, and $\mu$ denotes the electron mobility.

thereafter separating the trichloride by distillation from the dissociation products, and reducing the separated chloride with hydrogen to obtain pure arsenic.

3. The method of producing pure arsenic from impure arsenic halides containing sulfur chloride impurities, which comprises mixing with the arsenic halide a quantity of water just sufficient to hydrolyze the sulfur chloride impurities of the arsenic halide, but less than that which will react with the latter to form arsenic trioxide, thereafter separating the pure halide by distillation from the dissociation products, and reducing the separated pure halide with purified hydrogen to obtain arsenic at a temperature at least of about 500° C.

4. The method of producing pure arsenic from impure arsenic trichloride containing sulfur chloride impurities, which comprises mixing water with the trichloride in approximate volumetric ratio of one part of water to 40 parts of arsenic trichloride, said amount of water being just sufficient to hydrolyze the sulfur chloride impurities, thereafter separating the trichloride by distillation from the dissociation products, and reducing the separated chloride with hydrogen to obtain pure arsenic at a temperature of about 850° C.

5. The method of producing pure arsenic from impure

| InAs Rod No. | Purifying Method | Rod Cross Section (mm.) | Rod Length (cm.) | Hall Coefficient $R_H$ (average) (cm.$^3$ A$^{-1}$ sec.$^{-1}$) | $\mu$ (cm.$^2$ V$^{-1}$ sec.$^{-1}$) |
|---|---|---|---|---|---|
| 1 | AsCl$_3$ distilled, directly reduced with H$_2$ at 900° C. | 5.7 x 4.5 | 9.8 | 212.2 | 16,780–21,350 |
| 2 | AsCl$_3$ mixed with As$_2$O$_3$, heated 24 hours with reflux, distilled, reduced at 850° C. with H$_2$. | 8.3 x 3.5 | 9.5 | 330 | 24,600–25,800 |
| 3 | AsCl$_3$ mixed with As$_2$O$_3$, heated, with reflux for 9 hours, distilled, reduced at 850° C. with H$_2$. | 7.4 x 3.8 | 9.9 | 244 | 24,300–25,500 |
| 4 | AsCl$_3$ distilled, hydrolyzed to oxide, reduced with H$_2$ at 850° C. | 6.95 x 4.2 | 9.8 | 307 | 25,000–25,500 |
| 5 | AsBr$_3$ distilled twice at 15 mm. Hg, reduced with H$_2$ at 850° C. | 6.95 x 4.25 | 9.4 | 303 | 23,800–25,000 |
| 6 | Sublimation of As$_2$O$_3$ in O$_2$-current, reduction with H$_2$ at 1,000° C. | 6.9 x 4.4 | 9.9 | 257 | 23,800–24,250 |
| 7 | Method according to the invention | 7 x 4 | 9.7 | 325 | 27,000–28,500 |

The InAs-rod No. 7 containing arsenic produced in accordance with the invention, exhibits considerably better values, particularly with respect to electron mobility, than the rods containing arsenic made in accordance with the methods heretofore known.

We claim:

1. The method of producing pure arsenic from impure arsenic trichloride containing sulfur chloride impurities, which comprises mixing with the chloride a small quantity of water just sufficient to hydrolyze the sulfur chloride impurities of the arsenic trichloride but less than that which will react with the latter to form arsenic trioxide, thereafter separating the pure trichloride by distillation from the dissociation products, and reducing the separated pure arsenic trichloride with purified hydrogen to obtain arsenic.

2. The method of producing pure arsenic from impure arsenic trichloride containing sulfur chloride impurities, which comprises mixing water with the trichloride in approximate volumetric ratio of one part of water to 40 parts of arsenic trichloride, said amount of water being just sufficient to hydrolyze the sulfur chloride impurities, arsenic trichloride containing sulfur chloride impurities which comprises mixing with the arsenic trichloride a quantity of water just sufficient to hydrolytically dissociate the said sulfur chloride impurities but less than that which will react with the arsenic trichloride to form arsenic trioxide, thereafter separating the pure trichloride by distillation from the dissociation products and reducing the separated pure trichloride in a flow of hydrogen and adjusting the hydrogen flow to the speed at which the resulting arsenic is predominantly of the metallic modification.

References Cited

UNITED STATES PATENTS 1,512,734  10/1924  Wescott _____ 23—98
3,047,366  7/1962  Williams _____ 23—209 X

FOREIGN PATENTS 618,608  4/1961  Canada.

OSCAR R. VERTIZ, *Primary Examiner.*

V. H. LEVENSON, *Assistant Examiner.*